April 30, 1935.   N. S. AMIDON   1,999,952
BATTERY VENT CAP
Filed Sept. 28, 1932

INVENTOR.
Norman S. Amidon

BY Lancaster, Allwine and Rommel
ATTORNEYS.

Patented Apr. 30, 1935

1,999,952

UNITED STATES PATENT OFFICE 1,999,952

BATTERY VENT CAP

Norman S. Amidon, Lapeer, Mich.

Application September 28, 1932, Serial No. 635,271

2 Claims. (Cl. 136—177)

This invention relates to vent caps and more particularly to vent caps employed on storage batteries.

The principal object of the invention is to provide a vent cap having novel means to prevent harmful battery acid laden moisture from reaching the exterior of the battery.

Another object is to provide such a vent cap, comprising but two inexpensive and very easily assembled parts.

Another object is to provide a vent cap having the above features but which cap has no depending portion projecting into the battery chamber.

Still another object is to provide a vent cap, the outwardly projecting portion thereof being of material not subject to fracture when struck, nor easily damaged, and which will yield if an object comes into contact therewith.

Another object is to provide a novel vent cap having the above features and which is provided with a vent well above the top of battery posts and connections but which elevated vent will not entail the disadvantages incident to a rigid vent cap projecting high above a battery.

Other objects and advantages will be apparent during the course of the following detailed description, taken in connection with the accompanying drawing forming a part of this specification and in which drawing:—

Figure 1:
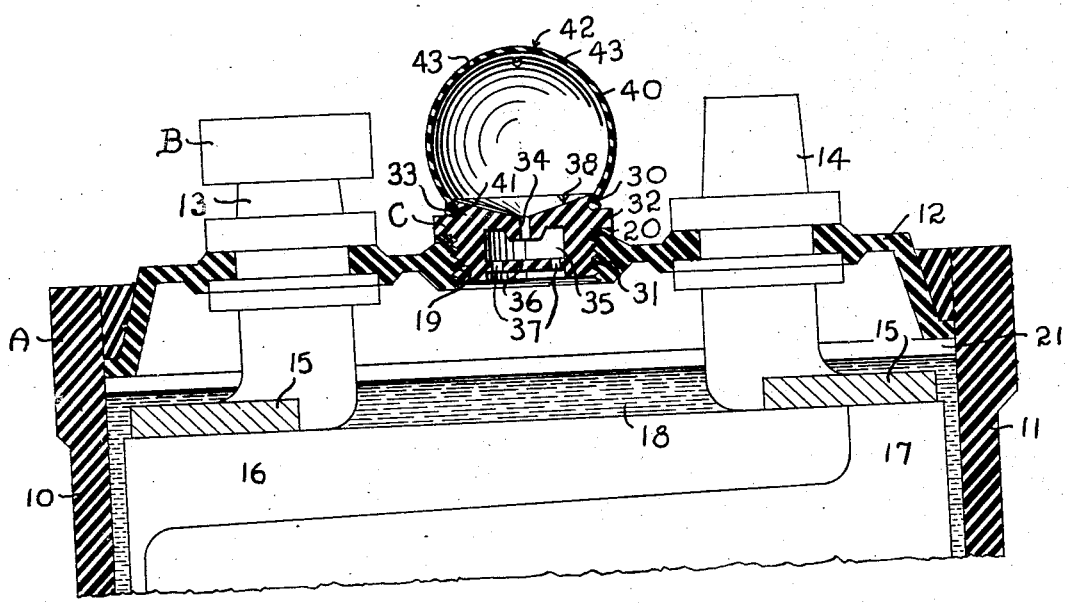
Figure 1 is a vertical sectional view of the improved vent cap applied to a conventional storage battery, shown in fragmentary vertical section.
Figure 2:
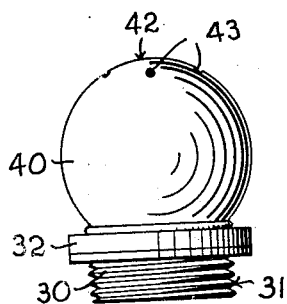
Figure 2 is an elevation of the improved vent cap.
Figure 3:
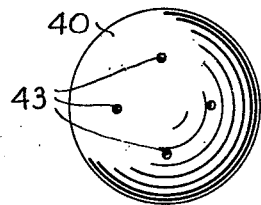
Figure 3 is a top plan view of the same.

In the drawing, wherein for the purpose of illustration is shown only a preferred embodiment of the invention, the letter A designates a conventional storage battery, B a terminal connector and C the improved vent cap.

The storage battery A includes side walls 10 and 11 and a cover 12 through which project the spaced apart positive and negative terminal posts 13 and 14 connected to conventional post straps 15 which are separately connected to the positive and negative battery plates 16 and 17, these being immersed into the electrolyte 18, which is ordinarily an acid, such as sulphuric acid, in solution. Spaced from the posts 13 and 14 is an opening 19 in the cover 12 which may be screw threaded as shown. A gasket 20 is ordinarily provided to encircle the outer end of the opening 19. As shown in Figure 1, the electrolyte 18 extends up into the chamber 21 of the battery to slightly below the cover 12.

The terminal connector B may be the ordinary ring, usually split, which encircles the battery post terminal.

As for the improved vent cap C, the same includes a main body portion 30, preferably cylindrical, one end (the lower) being provided with means to attach it to the battery cover 12, such means in the example shown being screw threads 31. Above these screw threads, the cylindrical body portion 30 is provided with a collar 32 which can be grasped by the hand or a tool to rotate the vent cap. Next above the collar 32 is a pripheral groove 33 and it can be seen from Figure 1 that the collar, in addition to its ordinary function, also provides what might be termed a continuation of the grooved wall. This peripheral groove 33 is preferably at the upper end of the main body portion 30. A fluid escape opening is provided thru the main body portion and preferably comprises an axially disposed vent 34, extending thru the main body portion, where it opens, at its lower end, into a chamber or recess 35 within the main body portion. The lower end of the chamber 35 is provided with a baffle 36 which may have perforations 37 or similar openings. However, it should be understood that the chamber 35 and the perforated baffle 36 are of conventional construction, the construction of this novel vent cap requiring only a small passageway or fluid escape opening extending from the lower end of the main body portion to the upper end thereof. Disposed in the upper end of the main body portion is a sump 38 or drain having inwardly sloping walls and leading to the upper or outer end of the vent 34. It will be noted that the sump extends to the very edge of the main body portion just above the groove 33. The main body portion 30 is preferably of molded rubber, or similar rigid material.

The sump 38 and upper end of the fluid escape opening (vent 34) is enclosed by a hollow member which preferably comprises a soft rubber ball 40. The ball has an elastic or stretchable mouth 41 which may have a thickened or reinforced edge adapted to contact with the walls of the groove 33, providing a tight seal between the main body portion 30 and the hollow member. It will be seen that the ball cannot be pushed down too far on the main body portion because of the collar 32 and that the concaved inner surface of the ball affords an easy and unobstructed transition between the said surface and the sump 38 so that moisture running down the concaved inner surface of the ball will not collect nor have its flow slowed by the juncture of the ball 40 and the main body portion 30. Adjacent the upper end 42 of the ball 40 are a plurality of small vents 43. These are arranged so that, when in use, their outlets will be above the upper ends of the battery posts 13 and 14 and above the terminal connector B. Since the ball 40 is of soft rubber and not an easily fractured composition, such as glass, objects striking it will not damage it and even if an object comes into contact with it, such as a member of the chassis of an automobile, it will not be damaged but simply distorted. In addition, it is apparent that if it is necessary to use a wrench to remove the vent cap, the rubber wall of the ball will not be damaged thereby nor interfere with the operation.

When in use, acid fumes and acid laden air and moisture from the battery will pass through the perforations 37, chamber 35 and vent 34 emerging into the hollow of the ball, where the condensate which will form upon the inner surface of the ball will drain back into the battery along the sloping interior surface of the ball and down the sump 38, vent 34 and perforations 35. Any acid passing through the vent 43 in the ball 40 ordinarily will be blown away before it can descend to the acid-attackable parts of the battery and connections. Since the inner or lower end of the vent cap does not extend below the inner surface of the cover 12 and consequently does not project to the electrolyte level, there is no possibility of gases being entrapped with no adequate outlet.

The two-piece vent cap may be manufactured cheaply and assembled in little time and the ball portion thereof may be easily renewed if necessary.

Various changes may be made to the form of invention herein shown and described, without departing from the spirit of the invention or the scope of the claims.

What is claimed is:

1. In a vent cap for storage batteries, a cylindrical main body portion provided with a substantially axially disposed vent therethrough and with a sump at one end leading to said vent, the surface of said sump extending to the outer edge of said main body portion, and a hollow member of elastic material, having a wholly concave inner surface and a mouth, disposed over said sump with the concave inner surface of said hollow member and the surface of said sump joining each other in a smooth, continuous curve and with said mouth stretched about the periphery of said cylindrical main body portion close adjacent the end thereof provided with said sump.

2. In a vent cap for storage batteries, a main body portion having a screw threaded end and provided with a shallow sump in the opposite end thereof with the surface of the sump sloping upwardly to and meeting the outer surfaces of the walls of said body portion, said sump having a vent at its lowermost portion, with the lowermost mouth of said vent being well above the extremity of the screw threaded end of said main body portion, said main body portion being provided with a chamber below said sump and spaced with its lowermost end above the extremity of said screw threaded end, and a perforated baffle below said chamber and spaced inwardly of the ends of said main body portion, the extended axis of said vent passing thru the solid portion of the baffle, and a hollow, substantially globular, perforated member enclosing said sump, having an elastic mouth with said mouth disposed in a tight fitting relation about the outer periphery of said main body portion adjacent the end thereof containing said sump and with the inner surface of said member meeting the surface of said sump.

NORMAN S. AMIDON.